United States Patent
Zhang et al.

(10) Patent No.: US 10,194,274 B2
(45) Date of Patent: Jan. 29, 2019

(54) METHOD AND DEVICE FOR PROVIDING WIRELESS ACCESS POINT

(71) Applicant: SHANGHAI LIANSHANG NETWORK TECHNOLOGY CO., LTD., Shanghai (CN)

(72) Inventors: FaYou Zhang, Shanghai (CN); Yuquan Wan, Shanghai (CN)

(73) Assignee: SHANGHAI LIANSHANG NETWORK TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/888,075

(22) Filed: Feb. 4, 2018

(65) Prior Publication Data
US 2018/0184247 A1 Jun. 28, 2018

Related U.S. Application Data

(63) Continuation of application No. PCT/CN2016/070677, filed on Jan. 12, 2016.

(30) Foreign Application Priority Data

Aug. 5, 2015 (CN) .......................... 2015 1 04744142

(51) Int. Cl.
*G01S 5/02* (2010.01)
*H04W 4/02* (2018.01)
(Continued)

(52) U.S. Cl.
CPC .......... *H04W 4/023* (2013.01); *H04L 41/0681* (2013.01); *H04L 41/12* (2013.01);
(Continued)

(58) Field of Classification Search
CPC ........ H04W 4/02; H04W 64/00; H04W 4/021; H04W 48/18
See application file for complete search history.

(56) References Cited

U.S. PATENT DOCUMENTS

2007/0280165 A1 12/2007 Doshi et al.
2010/0075697 A1 3/2010 Gupta et al.
(Continued)

FOREIGN PATENT DOCUMENTS

CN 101056276 A 10/2007
CN 103096423 A 5/2013
(Continued)

*Primary Examiner* — Diane D Mizrahi
(74) *Attorney, Agent, or Firm* — Gokalp Bayramoglu

(57) ABSTRACT

An objective of the present application is to provide a method and device for providing a wireless access point. The method includes: acquiring one or more wireless access points corresponding to target location information; loading at least one of the one or more wireless access points into map information corresponding to the target location information; and providing the map information loaded with the wireless access point. Compared with the prior art, in the present application, wireless access points corresponding to target location information are loaded into corresponding map information, and the map information loaded with the wireless access points is provided to corresponding user equipment, so that a user in need may intuitively know spatial locations of the wireless access points by using the map information and may further perform a corresponding subsequent operation.

10 Claims, 7 Drawing Sheets

(51) Int. Cl.
*H04L 12/24* (2006.01)
*H04W 48/16* (2009.01)
*H04W 64/00* (2009.01)

(52) U.S. Cl.
CPC ......... *H04W 48/16* (2013.01); *H04W 64/003* (2013.01); *G01S 5/0242* (2013.01)

(56) References Cited

U.S. PATENT DOCUMENTS

| | | | |
|---|---|---|---|
| 2011/0201360 A1 | 8/2011 | Garrett et al. | |
| 2013/0252631 A1* | 9/2013 | Alizadeh-Shabdiz | ....................... H04W 4/025 455/456.1 |
| 2014/0141803 A1* | 5/2014 | Marti | .................... H04W 4/043 455/456.2 |
| 2014/0171098 A1* | 6/2014 | Marti | .................... G01S 5/0252 455/456.1 |
| 2016/0295547 A1* | 10/2016 | Alizadeh-Shabdiz | ....................... H04W 4/025 |
| 2017/0018184 A1* | 1/2017 | Northrup | ................ G08G 1/144 |
| 2017/0311127 A1* | 10/2017 | Murphy | ................ H04W 4/026 |

FOREIGN PATENT DOCUMENTS

| | | |
|---|---|---|
| CN | 103874018 A | 6/2014 |
| CN | 103916934 A | 7/2014 |
| CN | 104768156 A | 7/2015 |

* cited by examiner

METHOD AND DEVICE FOR PROVIDING WIRELESS ACCESS POINT

CROSS REFERENCE TO RELATED APPLICATIONS

This is a Continuation Application of International Application PCT/CN2016/070677, filed on Jan. 12, 2016, which is based upon and claims priority to Chinese Patent Application No. 2015104744142, filed on Aug. 5, 2015, the entire contents of which are incorporated herein by reference.

TECHNICAL FIELD

The present application relates to the field of computers, and in particular, to a technology for providing a wireless access point.

RELATED ART

In the prior art, generally, wireless access points around user equipment are provided only in the form of an information list, from which a user cannot intuitively know spatial locations of the wireless access points. As a result, the user equipment cannot select a corresponding wireless access point rapidly by combining spatial factors of the wireless access points. In addition, in the prior art, the user equipment cannot intuitively obtain wireless access points within any region, and consequently the user is unable to know wireless access points within any region to perform a corresponding subsequent operation.

SUMMARY OF THE DISCLOSURE

An objective of the present application is to provide a method and device for providing a wireless access point.

According to one aspect of the present application, a method for providing a wireless access point is provided, including: acquiring one or more wireless access points corresponding to target location information;
loading at least one of the one or more wireless access points into map information corresponding to the target location information; and
providing the map information loaded with the wireless access point.

According to another aspect of the present application, a device for providing a wireless access point is further provided, including:
a first apparatus, configured to acquire one or more wireless access points corresponding to target location information;
a second apparatus, configured to load at least one of the one or more wireless access points into map information corresponding to the target location information; and
a third apparatus, configured to provide the map information loaded with the wireless access point.

Compared with the prior art, in a preferred embodiment, in the present application, wireless access points corresponding to target location information are loaded into corresponding map information, and the map information loaded with the wireless access points is provided to corresponding user equipment, so that a user in need may intuitively know spatial locations of the wireless access points by using the map information and may further perform a corresponding subsequent operation. Further, specific map information may be flexibly determined based on the target location information and coverage information corresponding to the wireless access points, so as to present corresponding map information to the corresponding user, thereby optimizing user experience. Further, when a trigger condition of requesting access point information is met, an access point information request about a wireless access point is acquired, so that a requirement for requesting access point information is actively determined for the user, and the map information loaded with a corresponding wireless access point is provided to the user equipment, thereby meeting wireless connection requirements of the user in different application scenarios, and saving data resources for the user. Further, access point related information of a specific wireless access point is presented based on an operation of viewing a wireless access point in the map information by the user, so that information data acquired by the user is enriched, and the user may preferably select, based on the access point related information, a wireless access point suitable for establishing a wireless connection.

BRIEF DESCRIPTION OF THE DRAWINGS

Other features, objectives, and advantages of the present application will become more obvious by reading the detailed description of nonlimitative embodiments that is provided with reference to the following accompanying drawings.

Same or similar reference numerals indicate same or similar components in the accompanying drawings.

DETAILED DESCRIPTION OF THE DISCLOSURE

The present application is further described below in detail with reference to the accompanying drawings.

In a typical configuration of the present application, a terminal, a device of a service network, and a trusted party all include one or more processors (CPUs), an input/output interface, a network interface, and a memory.

The memory may include a form such as a non-permanent memory, a random-access memory (RAM) and/or a non-volatile memory of computer readable media, for example, a read-only memory (ROM) or a flash random-access memory (RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of a storage medium of a computer include, but are not limited to, a phase-change random-access memory (PRAM), a static random-access memory (SRAM), a dynamic random-access memory (DRAM), a RAM of another type, a ROM, an electrically erasable programmable read-only memory (EEPROM), a flash memory or another memory technology, a compact disc read-only memory (CD-ROM), a digital versatile disc (DVD) or another optical storage device, a cassette tape, disk and tape memory or another magnetic storage device, or any other non-transmission media, which may be configured to store information that can be accessed by a computing device. According to limitations of this specification, the computer readable medium does not include a non-transitory computer readable medium, such as a modulated data signal and a modulated carrier.

Figure 1:
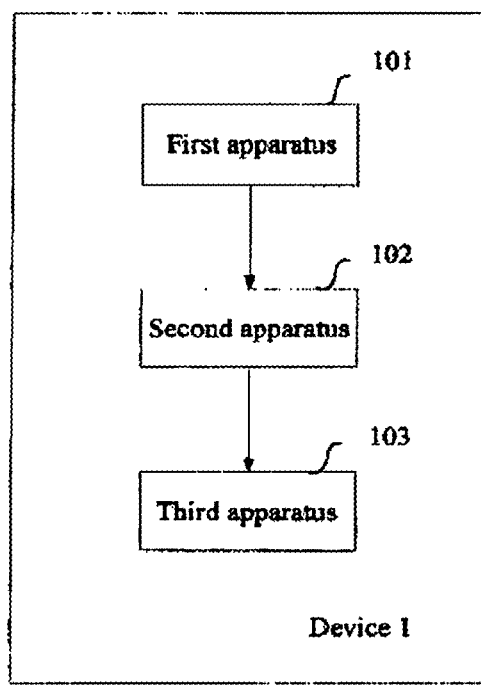
FIG. 1 is a schematic device diagram of a device for providing a wireless access point according to an aspect of the present application.

FIG. 1 is a schematic device diagram of a device 1 for providing a wireless access point according to an aspect of the present application. The device 1 includes a first apparatus 101, a second apparatus 102, and a third apparatus 103.

The first apparatus 101 acquires one or more wireless access points corresponding to target location information. The second apparatus 102 loads at least one of the one or more wireless access points into map information corresponding to the target location information. The third apparatus 103 provides the map information loaded with the wireless access point.

Specifically, here, the device 1 for providing a wireless access point includes various smart terminals, for example, smartphones, various personal computers, and cloud servers. Moreover, a person skilled in the art should know that providing the wireless access point as described in the present application may be accomplished in user equipment, for example, in various mobile smart terminals; or may be accomplished in a network device, for example, in a cloud server; or even a part of processing may be accomplished in user equipment and another part of processing may be accomplished in a corresponding network device. Therefore, the device 1 for providing a wireless access point may include user equipment or a network device. Here, preferably, in the present application, unless it is explicitly stated that the device 1 is only a user equipment or is only a network device, or explicitly stated that an apparatuses is only the apparatus in user equipment or only the apparatus in a network device, it is considered that the device 1 may be user equipment or may be a network device and the apparatus may be the apparatus in user equipment or the apparatus in a network device.

Here, the first apparatus 101 acquires one or more wireless access points corresponding to target location information. In this case, the device 1 may preferably be user equipment. The wireless access point is an access point of a corresponding wireless network. The wireless network includes, but is not limited to, a wireless local area network based on protocols of the IEEE 802.11 series standards, for example, a wireless local area network based on the IEEE 802.11b protocol, that is, a so-called Wireless Fidelity (WiFi) network. The user equipment may access the corresponding wireless network through the wireless access point. Here, the target location information includes latitude and longitude information of a target location, and may further include address information of the target location, for example, NO. G, F Street, E District, City D. The target location information may include current geographical location information of the user equipment, or may further include geographical location information arbitrarily selected by a corresponding user. For example, the current geographical location information of the user equipment may be latitude and longitude information of the corresponding user equipment acquired by using an assisted global positioning system (AGPS) function or a global positioning system (GPS) function in the user equipment. For another example, the user equipment may directly acquire the target location information submitted by the corresponding user, e.g., the user inputs the target location information based on information input prompt information on a display interface of the user equipment and submits the target location information. Further, the one or more wireless access points corresponding to the target location information that are acquired by the first apparatus 101 of the user equipment may be from a network device corresponding to the user equipment. The network device includes a cloud server, which may be a single server or a server cluster. Here, a massive amount of wireless access points and corresponding access point related information are preferably stored in the network device. The access point related information includes, but is not limited to, access point name information, location information, signal strength information, connection speed information, access information, architecture related information, navigation information, information about a distance from a target location, and whether information can be presented on the user equipment. Specifically, the user equipment sends the target location information to the corresponding network device. The network device searches for, through matching, the one or more wireless access points corresponding to the target location information. For example, based on target location information A, the network device searches the massive amount of wireless access points stored in the network device for a wireless access point of which an actual distance from the target location information A is within a particular range, then, the user equipment acquires the matching one or more wireless access points determined by the network device. In this case, the acquired wireless access points may be all or some of the wireless access points matched by the network device. In addition, preferably, when acquiring the wireless access points, the user equipment may further acquire the access point related information corresponding to the wireless access points.

Next, the second apparatus 102 loads at least one of the one or more wireless access points into map information corresponding to the target location information. Here, the device 1 may preferably be user equipment. Here, the specific map information may be determined based on the target location information, and then the wireless access point is loaded into the determined specific map information. Here, the map information includes electronic map information in various forms. In this case, the precision of location information in the map information needs to match the target location information. The map information corresponds to the target location information, for example, a region covered by the map information needs to include the target location information. Further, the target location information is preferably used as the center in the region covered by the map information. Here, the loading includes adding a particular graphical sign of the wireless access point to a matching location in the map information. Further, information such as access point related information corresponding to the wireless access point and another related operation module may further be loaded into the map information together.

Next, the third apparatus 103 provides the map information loaded with the wireless access point. Here, the device 1 may preferably be user equipment. Here, the providing the map information loaded with the wireless access point includes presenting the map information at the user equipment, for example, on the display interface of the user equipment. In this case, the wireless access point in the map information may be displayed by using any customized graphical sign. Further, the wireless access point in the map information may preferably further correspond to the access point related information. For example, the corresponding access point related information may be viewed based on a user operation corresponding to the user equipment. Further, preferably, based on the access point related information of the wireless access point, for example, based on the differentiation of the wireless access point, the information about the wireless access point in the provided map information may be differentially presented. For example, the wireless access point may be an automatic connection access point or an open access point, which may be differentiated on a map by using graphical signs having different colors. Here, according to an actual requirement, the map information may further be provided to any device other than the device 1. Here, the user equipment or any other device may perform another subsequent operation based on the provided map information. For example, the user corresponding to the user equipment views a corresponding wireless access point or selects a corresponding wireless access point to establish a connection or performs another operation on a corresponding wireless access point based on the provided map information.

Here, a person skilled in the art should know that it is merely an example that the providing the map information loaded with the wireless access point includes presenting the map information at the user equipment, and another existing or potential manner of providing the map information loaded with the wireless access point that is applicable to the present application shall fall within the protection scope of the present application, and is incorporated herein by way of reference.

Here, a person skilled in the art should know that the device 1 is preferably user equipment, and the first apparatus 101, the second apparatus 102, and the third apparatus 103 are corresponding apparatuses in the user equipment. In addition, the device 1 may be a network device, and further, the first apparatus 101, the second apparatus 102, and the third apparatus 103 may be corresponding apparatuses in the network device. In addition, in the present application, it is possible that at least one of the first apparatus 101, the second apparatus 102, and the third apparatus 103 exists in the user equipment, and at least one of the first apparatus 101, the second apparatus 102, and the third apparatus 103 exists in the network device.

Here, in the present application, wireless access points corresponding to target location information are loaded into corresponding map information, and the map information loaded with the wireless access points is provided to corresponding user equipment, so that a user in need may intuitively know spatial locations of the wireless access points by using the map information and may further perform a corresponding subsequent operation.

Preferably, the second apparatus 102 loads the at least one of the one or more wireless access points into the map information corresponding to the target location information according to access point location information corresponding to the wireless access point, wherein a loading location of the wireless access point in the map information matches a location of the access point.

Specifically, the device 1 may preferably be user equipment. Here, for example, the wireless access point acquired by the user equipment is from a corresponding network device. Preferably, the acquired wireless access point corresponds to the access point related information including the access point location information of the wireless access point. The access point location information may be latitude and longitude information corresponding to the wireless access point, or may be specific address information or the like corresponding to the wireless access point. Moreover, the region covered by the map information includes the access point location of the wireless access point. Further, a map location corresponding to the access point location information of the wireless access point in the map information is a specific matching loading location of the wireless access point in the map information. Therefore, the at least one of the one or more wireless access points is loaded into the map information corresponding to the target location information based on the loading location.

Preferably, the device 1 further includes a fourth apparatus (not shown). The fourth apparatus determines display ratio information corresponding to the at least one of the one or more wireless access points in the map information. The third apparatus 103 provides the map information loaded with the wireless access point according to the display ratio information.

Specifically, the device 1 may preferably be user equipment. Here, the map information corresponds to the target location information. The region covered by the map information needs to include the target location information. Further, the target location information is preferably used as the center in the region covered by the map information. Here, the map information is preferably presented at the user equipment or any other smart terminal device having a display interface. The display interface of the user equipment is limited, especially when the user equipment is a small smart terminal device such as a smartphone and a tablet computer. Therefore, the corresponding display ratio information may be determined. For example, the target location information is used as the display center, and a minimum value of a distance between two wireless access points of the wireless access points loaded into the map information may be selected as the minimum granularity of the map information being initially displayed on the display interface. In this case, different wireless access points can be directly and distinctly recognized in the map information based on a location relationship. For another example, an optimal value of the quantity of wireless access points displayed on the display interface of the user equipment may be preset first. Therefore, based on information about the value, the display ratio information corresponding to the map information is flexibly adjusted, so that the corresponding user may at the same time view a wireless access point corresponding to the optimal value on an initial display interface corresponding to the map information based on the selected display ratio information. For further another example, the target location information may be used as the display center, and all the loaded wireless access points are presented on the interface of the user equipment at the same time. In this case, a display ratio of the presented map information is the determined display ratio information.

Next, based on the display ratio information determined by the fourth apparatus, the third apparatus 103 provides the map information loaded with the wireless access point according to the display ratio information. Here, the map information that is provided by the third apparatus 103 and is based on the display ratio information is only a preset preferred display state, and different display ratio information focuses on user requirements in different scenarios. For example, the display ratio information preset by user equipment may follow a same standard. For example, in any user equipment, a display ratio of 1:N is used to provide the map information loaded with the wireless access point. For another example, different display ratio information may be preset based on different display terminals. For example, in user equipment A, a display ratio of 1:M is used to provide the map information, whereas in user equipment B, a display ratio of 1:L is used to provide the map information. Further alternatively, even for a same display terminal, if specific application examples are different, the determined display ratio information may be different. For example, for same user equipment, different quantities of wireless access points are determined based on different target location information, and further, the eventually provided map information loaded with the wireless access point may correspond to different display ratio information. In addition, if subsequently, the corresponding user hopes to query access point information of a corresponding wireless access point or select a wireless access point to establish a connection or perform another operation on a wireless access point based on the provided map information, the display ratio of the map information presented on the display interface of the user equipment may be arbitrarily adjusted based on a customized gesture operation.

Here, in the present application, display ratio information is determined, and the map information loaded with the wireless access point is provided based on the display ratio information, so that the user equipment may present optimal map information based on different application scenarios, making it convenient for the user to correspondingly view the map information, make a selection in the map information or perform another operation on the map information, including the wireless access point loaded into the map information, thereby optimizing user experience.

Figure 2:
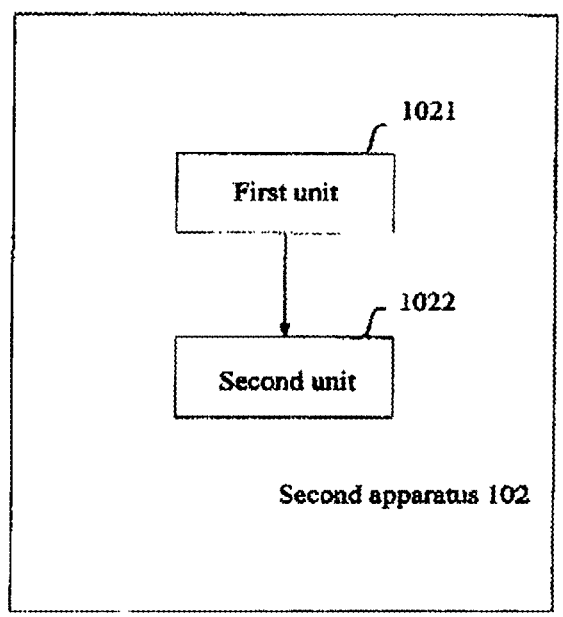
FIG. 2 is a schematic device diagram of a second apparatus in the device for providing a wireless access point according to a preferred embodiment of the present application.

FIG. 2 is a schematic device diagram of the second apparatus 102 in the device 1 for providing a wireless access point according to a preferred embodiment of the present application. The second apparatus 102 includes a first unit 1021 and a second unit 1022.

The first unit 1021 acquires the map information corresponding to the target location information. The second unit 1022 loads the at least one of the one or more wireless access points into the map information.

Specifically, the device 1 may preferably be user equipment. First, the first unit 1021 of the user equipment acquires the map information corresponding to the target location information. Here, the map information may be acquired from a network device corresponding to the user equipment, or the corresponding map information may be acquired from another third-party device or database. Here, the precision of location information in the map information needs to match the target location information. The map information corresponds to the target location information. For example, the region covered by the map information needs to include the target location information. Further, the target location information is preferably used as the center in the region covered by the map information. In this case, the region covered by the map information may further be determined based on the target location information and in combination with an actual user requirement. Next, the second unit 1022 of the user equipment loads the at least one of the one or more wireless access points into the map information. Here, the access point location information corresponding to the wireless access point loaded into the map information is included in the region covered by the map information.

Preferably, the first unit 1021 determines coverage information corresponding to the one or more wireless access points according to the access point location information corresponding to the wireless access point, so as to acquire the map information corresponding to the target location information according to the target location information and the coverage information.

Specifically, the device 1 may preferably be user equipment. Here, wireless access points acquired by the user equipment respectively correspond to corresponding access point location information. For example, wireless access points R1, R2, R3, . . . respectively correspond to access point location information T1, T2, T3, . . . . Therefore, the coverage information corresponding to the one or more wireless access points may be determined based on the access point location information T1, T2, T3, . . . . Further, preferably, a region covered by the map information that needs to be acquired from the corresponding network device or the another third-party device or database and is used for loading the wireless access point may be determined based on the coverage information. Here, further, the acquired map information may preferably be determined based on both the target location information and the coverage information. For example, an area that uses the target location as the center and the coverage as the radius is the region covered by the map information, and all the wireless access points are covered in the map information.

Figure 3:
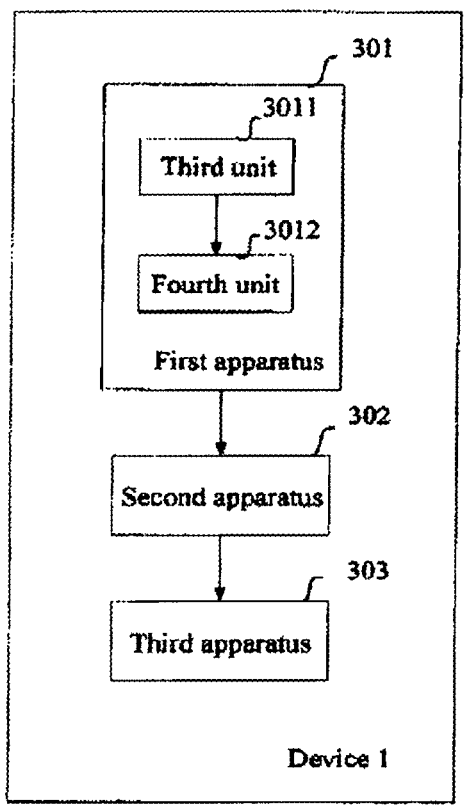
FIG. 3 is a schematic device diagram of a device for providing a wireless access point according to another preferred embodiment of the present application.

FIG. 3 is a schematic device diagram of a device 1 for providing a wireless access point according to another preferred embodiment of the present application. The device 1 includes a first apparatus 301, a second apparatus 302, and a third apparatus 303. The first apparatus 301 further includes a third unit 3011 and a fourth unit 3012.

The third unit 3011 of the first apparatus 301 acquires an access point information request about a wireless access point, where the access point information request includes target location information. The fourth unit 3012 of the first apparatus 301 acquires one or more wireless access points corresponding to the target location information. Here, the second apparatus 302 loads at least one of the one or more wireless access points into map information corresponding to the target location information. Here, the third apparatus 303 provides the map information loaded with the wireless access point to user equipment corresponding to the access point information request.

Specifically, the third unit 3011 of the first apparatus 301 acquires an access point information request about a wireless access point, where the access point information request includes the target location information. Preferably, the device 1 may be a network device. Here, the access point information request about a wireless access point acquired by the third unit 3011 of the network device may be from the user equipment corresponding to the network device. The access point information request sent by the user equipment includes request information automatically sent by the user equipment based on a particular trigger condition, or further includes request information that is acquired by the user equipment and is directly sent by a corresponding user. Based on the characteristic that spatial location information is used as an identifier for the map information, the access point information request preferably includes the target location information. The target location information may include current geographical location information of the user equipment, or may further include geographical location information arbitrarily selected by the corresponding user.

Next, the fourth unit 3012 of the first apparatus 301 acquires the one or more wireless access points corresponding to the target location information. Preferably, the device 1 may be a network device. Here, the fourth unit 3012 of the network device searches, based on the acquired target location information, a massive amount of wireless access points stored in the network device for wireless access point(s) matching the target location information. For example, a particular search range is set, e.g., all wireless access points in a range that uses the target location information as the center and has a diameter W are the one or more wireless access points corresponding to the target location information.

Next, the second apparatus 302 loads at least one of the one or more wireless access points into map information corresponding to the target location information. Here, the second apparatus 302 is preferably a corresponding apparatus in the network device. The map information may be from another third-party device or database. Here, the specific map information may be determined based on the target location information, and then the wireless access point is loaded into the determined specific map information. Here, the map information includes electronic map information in various forms. In this case, the precision of location information in the map information needs to match the target location information. The map information corresponds to the target location information. For example, the region covered by the map information needs to include the target location information. Further, the target location information is preferably used as the center in the region covered by the map information.

Next, the third apparatus 303 provides the map information loaded with the wireless access point to user equipment corresponding to the access point information request. Here, the third apparatus 303 is only a corresponding apparatus in the network device. Here, the second apparatus 302 determines the map information loaded with the wireless access point. Further, the map information may be provided to the corresponding user equipment or another smart terminal device in need according to an actual application requirement. Preferably, the map information is sent to the corresponding user equipment that sends the access point information request. Here, the user equipment or any other device may perform another subsequent operation based on the provided map information. For example, the user corresponding to the user equipment views a corresponding wireless access point or selects a corresponding wireless access point to establish a connection or performs another operation on a corresponding wireless access point based on the provided map information.

In this preferred embodiment, the device is the network device. In the present application, based on an actual requirement of the user equipment corresponding to the network device, for example, based on that the user equipment needs to know access point information of the wireless access point corresponding to the target location information, the map information loaded with information about the corresponding wireless access point is generated, and the network device provides the determined map information to the corresponding user equipment in need, making it convenient for the user corresponding to the user equipment to know the wireless access point and the access point related information corresponding to the wireless access point or establish a corresponding wireless connection based on intuitive map information.

Here, a person skilled in the art should know that the first apparatus 301 and the second apparatus 302 may be corresponding apparatuses in a network device or corresponding apparatuses in user equipment. The third apparatus 303 is only a corresponding apparatus in the network device.

Preferably, when a trigger condition of requesting access point information is met, the third unit 3011 acquires the access point information request about a wireless access point, where the access point information request includes the target location information.

Specifically, here, the device 1 is preferably user equipment. Here, when the trigger condition occurs, the user equipment may determine a corresponding access point information request. The trigger condition may include an active request operation of the user. For example, the user corresponding to the user equipment actively triggers, based on operation prompt information displayed on an interface of the user equipment, submission of a request of acquiring map information matching the target location information and loaded with information about a wireless access point. The trigger condition may further include a corresponding trigger condition preset by the user equipment or a network device corresponding to the user equipment. When the trigger condition occurs, the user equipment actively triggers the acquisition of the access point information request that includes the target location information, and further sends the access point information request about a wireless access point to a corresponding network device.

Further, the trigger condition preferably includes at least any one of the following: a trigger condition determined based on a network condition of the user equipment; that current network data consumption of the user equipment exceeds a preset threshold; and that an application of a predetermined type is currently running in the user equipment.

Specifically, here, the device 1 is preferably user equipment. Here, the trigger condition may include the trigger condition determined based on the network condition of the user equipment. For example, when the user equipment detects that the user equipment is using a mobile communications network such as a third generation (3G) digital communications network or a fourth generation (4G) digital communications network, the user equipment may actively send the access point information request or prompt the corresponding user to send the access point information request. The reason is that in most cases, the corresponding user equipment needs to pay to use the mobile communications network, but wireless access point provided in the map information has a high connection success rate, and a wireless access point shared by another person may usually be used for free. Here, the access point information request includes the target location information. Preferably, the target location information may be the current geographical location information of the user equipment.

Here, the trigger condition may further include that the current network data consumption of the user equipment exceeds the preset threshold. In this case, the user corresponding to the user equipment may customize a network data threshold of the user equipment. For example, the user may flexibly set a corresponding network data threshold based on a particular period, for example, every day or every month, so as to monitor the use of network data and avoid excessive use of the network data, particularly, to avoid excessive use of the network data when the user equipment needs to pay for the network data. Further, when the network data used by the user equipment exceeds the preset threshold, it is triggered to request access point information. Here, the access point information request includes the target location information. Preferably, the target location information may be the current geographical location information of the user equipment.

Here, the trigger condition may further include that the application of a predetermined type is currently running in the user equipment. Preferably, the application of a predetermined type includes an application that consumes a relatively large amount of data, for example, an application program that needs to load a relatively large quantity of pictures, videos, and audio. Specifically, the application of a predetermined type includes various online video applications. Here, the application of a predetermined type may be labeled and determined by the user, or may further be determined by the user equipment through statistical analysis and recommendation based on historical data information. Here, for the time of starting the trigger condition, the user equipment may automatically trigger to request access point information or prompt the user to trigger to request access point information as soon as the application of a predetermined type is started. Alternatively, further precisely, it may further be determined that the trigger condition occurs after the application of a predetermined type has been started for a particular time or after the application keeps consuming data for a particular time. Here, the access point information request includes the target location information. Preferably, the target location information may be the current geographical location information of the user equipment.

Here, a person skilled in the art should know that the foregoing trigger conditions are merely examples, and another existing or potential trigger condition that is applicable to the present application shall fall within the protection scope of the present application, and is incorporated herein by way of reference.

In the present application, when a trigger condition of requesting access point information is met, an access point information request about a wireless access point is acquired, so that a requirement for requesting access point information is actively determined for the user, and map information loaded with a corresponding wireless access point is provided to user equipment, thereby meeting wireless connection requirements of the user in different application scenarios, and saving data resources for the user.

Preferably, the fourth unit 3012 acquires one or more candidate wireless access points corresponding to the target location information; and preferably selects the one or more wireless access points from the one or more candidate wireless access points according to access point related information of the candidate wireless access point.

Specifically, here, the device 1 is preferably a network device. The fourth unit 3012 of the network device searches, based on the acquired target location information, the massive amount of wireless access points stored in the network device for the one or more candidate wireless access points matching the target location information. For example, a particular search range is set. For example, all wireless access points in a range that uses the target location information as the center and has a diameter V are the one or more candidate wireless access points corresponding to the target location information. In this case, particularly, when a particular region has a relatively large quantity of candidate wireless access points, the candidate wireless access points have different connection success rates, different connection quality, and different conditions about whether it is convenient for the user to connect to the candidate wireless access points, among other factors. Therefore, if the large quantity of wireless access points is provided without distinction, it is particularly difficult for the user to select a wireless access point, and the user cannot desirably determine whether a wireless access point has a relatively high connection success rate. Therefore, preferably, a candidate wireless access point may preferably be selected from the one or more candidate wireless access points based on access point related information corresponding to the wireless access point. The access point related information includes, but is not limited to, access point name information, location information, signal strength information, connection speed information, access information, architecture related information, navigation information, information about a distance from a target location, and whether information can be presented on the user equipment. For example, here, the wireless access point may preferably be a wireless access point that has relatively high signal strength, a relatively high connection speed, and a relatively short distance from the target location. In this case, an actual condition of an application corresponding to the user equipment may further be combined. For example, if the user equipment is currently used to make an online payment, it is hoped that a wireless network has a relatively high safety coefficient. In this case, safety information or the architecture related information of the wireless access points may be used as a reference, so as to preferably select a wireless access point that has a relatively high safety coefficient from the candidate wireless access points. Further, the network device loads the preferably selected one or more wireless access points into the map information corresponding to the target location information, and provides the map information to the corresponding user equipment or another third-party device in need.

Here, in the present application, a wireless access point suitable for being loaded into the map information is preferably selected from the candidate wireless access points based on access point related information that is stored in the network device and corresponds to the wireless access point. In this way, most valuable map information can be provided to the user according to an actual application requirement of the user, the user equipment can conveniently select a wireless access point based on preferably selected wireless access points loaded into the map information, and a connection success rate is relatively high, thereby optimizing user experience.

Referring to FIG. 1, the device 1 preferably further includes a fifth apparatus (not shown). The fifth apparatus presents access point related information of a corresponding wireless access point in the map information according to an operation of viewing a wireless access point in the map information by the user.

Specifically, the fifth apparatus only corresponds to a corresponding apparatus in the user equipment. Here, the third apparatus 103 provides the map information loaded with the wireless access point. Preferably, the providing the map information loaded with the wireless access point includes presenting the map information at the user equipment, for example, on a display interface of the user equipment. In this case, the wireless access point in the map information may be displayed by using any customized graphical sign. In addition, the wireless access point further matches the corresponding access point related information. Preferably, the access point related information is not directly displayed in the map information, but instead is associated with a graphical sign of the wireless access point.

When the user performs an operation of viewing the presented graphical sign of the wireless access point in the map information, for example, selects the graphical sign of the wireless access point by using a customized gesture operation such as a tap or a long press, access point related information of the viewed wireless access point is presented on the display interface of the user equipment. For example, the access point related information is presented in the form of a small popup window. Here, all the access point related information corresponding to the viewed wireless access point may be presented. Alternatively, a presentation manner or specific presented content may be flexibly set according to the size of a display presentation area of the user equipment and an application scenario. In addition, the user may further directly search the map information for a wireless access point with known name information. For example, the user directly enters name information of a wireless access point to be viewed in an information input box presented on the display interface of the user equipment, so as to rapidly locate the wireless access point, making it convenient for the user to view the information of the wireless access point.

Here, in the present application, access point related information of a specific wireless access point is presented based on an operation of viewing a wireless access point in the map information by the user, so that information data acquired by the user is enriched, and the user may preferably select, based on the access point related information, a wireless access point suitable for establishing a wireless connection.

In a preferred embodiment (referring to FIG. 1), the device 1 further includes a sixth apparatus (not shown). The sixth apparatus establishes a wireless connection between the corresponding user equipment and a corresponding wireless access point according to an operation of connecting to a wireless access point in the map information by the user.

Specifically, the device 1 is preferably user equipment. Here, the wireless access point in the map information presented in the user equipment may match a corresponding connection operation. That is, based on the selection of the wireless access point by the user, the wireless connection between the user equipment and the wireless access point is established. For example, if access information, for example, access password information, corresponding to the selected wireless access point is already stored in the user equipment, based on a defined connection operation by the user, for example, an operation of tapping a connection icon provided on the interface by the user and in combination with the access password information, a request of establishing the wireless connection is sent to the corresponding wireless access point. For another example, if the access information corresponding to the selected wireless access point is not stored in the user equipment, based on a defined connection operation by the user, for example, an operation of tapping a connection icon provided on the interface by the user, a request of acquiring the access information of the wireless access point is sent to a network device corresponding to the user equipment. Further, the wireless connection with the wireless access point is established based on the acquired access information, for example, the acquired access password information.

Here, in the present application, at the same time when a user views map information, the user may conveniently and directly establish a corresponding wireless connection based on a viewed and selected wireless access point. Therefore, complex operations of switching between different applications or different interfaces in viewing and connecting to a wireless access point are avoided, so as to improve the efficiency of establishing a wireless connection based on the wireless access point by the user, thereby optimizing user experience.

Preferably, the second apparatus 102 further includes a fifth unit (not shown). The fifth unit inserts a wireless connection module at a loading location of the wireless access point in the map information. The sixth apparatus executes the wireless connection module according to an operation of connecting to a wireless access point in the map information by the user to establish the wireless connection between the corresponding user equipment and the corresponding wireless access point.

Specifically, the device 1 is preferably user equipment. The fifth unit of the user equipment inserts a wireless connection module at the loading location of the wireless access point in the map information. Here, when the wireless access point is loaded at a corresponding location in the map information based on corresponding access point location information, a wireless connection module matching the wireless access point is inserted at the loading location at the same time. The wireless connection module includes an executable page script file corresponding to a wireless connection operation. For example, a page script file describing an action of establishing a wireless connection with the wireless access point is loaded into the map information. In this way, when the user equipment acquires the operation of connecting to a wireless access point in the map information by the user, it is triggered to invoke and execute the corresponding script file in the background to respond to a connection operation of the user. Based on this, the sixth apparatus establishes the wireless connection between the corresponding user equipment and the corresponding wireless access point.

Here, a person skilled in the art should know that the foregoing executable page script file corresponding to the wireless connection operation is merely an example, and another existing or potential wireless connection module that is applicable to the present application shall fall within the protection scope of the present application, and is incorporated herein by way of reference.

Figure 4:
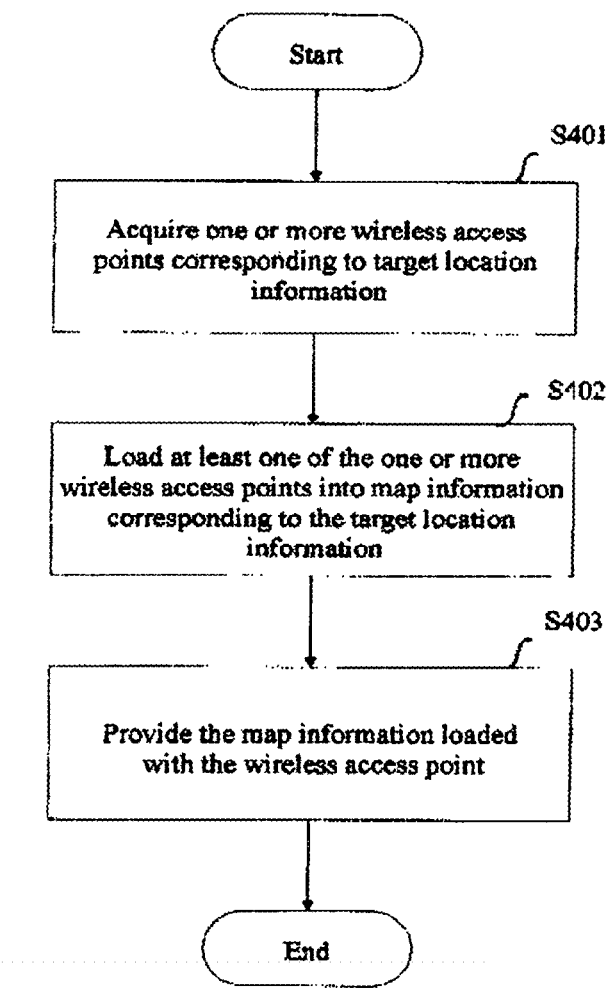
FIG. 4 is a flowchart of a method for providing a wireless access point according to another aspect of the present application.

FIG. 4 is a flowchart of a method for providing a wireless access point according to another aspect of the present application. The method includes step S401, step S402, and step S403.

In the step S401, the device 1 acquires one or more wireless access points corresponding to target location information. In the step S402, the device 1 loads at least one of the one or more wireless access points into map information corresponding to the target location information. In the step S403, the device 1 provides the map information loaded with the wireless access point.

Specifically, here, the device 1 for providing a wireless access point includes various smart terminals, for example, smartphones, various personal computers, and cloud servers. Moreover, a person skilled in the art should know that providing the wireless access point as described in the present application may be accomplished in user equipment, for example, in various mobile smart terminals; or may be accomplished in a network device, for example, in a cloud server; or even a part of processing may be accomplished in user equipment and another part of processing may be accomplished in a corresponding network device. Therefore, the device 1 for providing a wireless access point may include user equipment or a network device. Here, preferably, in the present application, unless it is explicitly stated that the device 1 is only a user equipment or is only a network device, or explicitly stated that an apparatuses is only the apparatus in user equipment or only the apparatus in a network device, it is considered that the device 1 may be user equipment or may be a network device and the apparatus may be the apparatuses in user equipment or the apparatuses in a network device.

Here, in the step S401, the device 1 acquires one or more wireless access points corresponding to target location information. In this case, the device 1 may preferably be user equipment. The wireless access point is an access point of a corresponding wireless network. The wireless network includes, but is not limited to, a wireless local area network based on protocols of the IEEE 802.11 series standards, for example, a wireless local area network based on the IEEE 802.11b protocol, that is, a so-called WiFi network. The user equipment may access the corresponding wireless network through the wireless access point. Here, the target location information includes latitude and longitude information of a target location, and may further include address information of the target location, for example, NO. G, F Street, E District, City D. The target location information may include current geographical location information of the user equipment, or may further include geographical location information arbitrarily selected by a corresponding user. For example, the current geographical location information of the user equipment may be latitude and longitude information of the corresponding user equipment acquired by using an ALPS function or a GPS function in the user equipment. For another example, the user equipment may directly acquire the target location information submitted by the corresponding user. For example, the user enters the target location information based on information input prompt information on a display interface of the user equipment and submits the target location information. Further, the one or more wireless access points corresponding to the target location information that are acquired by the user equipment may be from a network device corresponding to the user equipment. The network device includes a cloud server, which may be a single server or a server cluster. Here, a massive amount of wireless access points and corresponding access point related information are preferably stored in the network device. The access point related information includes, but is not limited to, access point name information, location information, signal strength information, connection speed information, access information, architecture related information, navigation information, information about a distance from a target location, and whether information can be presented on the user equipment. Specifically, the user equipment sends the target location information to the corresponding network device. The network device searches for, through matching, the one or more wireless access points corresponding to the target location information. For example, based on target location information A, the network device searches the massive amount of wireless access points stored in the network device for a wireless access point of which an actual distance from the target location information A is within a particular range. Further, the user equipment acquires the matching one or more wireless access points determined by the network device. In this case, the acquired wireless access points may be all or some of the wireless access points matched by the network device. In addition, preferably, when acquiring the wireless access points, the user equipment may further acquire the access point related information corresponding to the wireless access points.

Next, in the step S402, the device 1 loads at least one of the one or more wireless access points into map information corresponding to the target location information. Here, the device 1 may preferably be user equipment. Here, the specific map information may be determined based on the target location information, and then the wireless access point is loaded into the determined specific map information. Here, the map information includes electronic map information in various forms. In this case, the precision of location information in the map information needs to match the target location information. The map information corresponds to the target location information. For example, a region covered by the map information needs to include the target location information. Further, the target location information is preferably used as the center in the region covered by the map information. Here, the loading includes adding a particular graphical sign of the wireless access point to a matching location in the map information. Further, information such as access point related information corresponding to the wireless access point and another related operation module may further be loaded into the map information together.

Next, in the step S403, the device 1 provides the map information loaded with the wireless access point. Here, the device 1 may preferably be user equipment. Here, the providing the map information loaded with the wireless access point includes presenting the map information at the user equipment, for example, on the display interface of the user equipment. In this case, the wireless access point in the map information may be displayed by using any customized graphical sign. Further, the wireless access point in the map information may preferably further correspond to the access point related information. For example, the corresponding access point related information may be viewed based on a user operation corresponding to the user equipment. Further, preferably, based on the access point related information of the wireless access point, for example, based on the differentiation of the wireless access point, the information about the wireless access point in the provided map information may be differentially presented. For example, the wireless access point may be an automatic connection access point or an open access point, which may be differentiated on a map by using graphical signs having different colors. Here, according to an actual requirement, the map information may further be provided to any device other than the device 1. Here, the user equipment or any other device may perform another subsequent operation based on the provided map information. For example, the user corresponding to the user equipment views a corresponding wireless access point or selects a corresponding wireless access point to establish a connection or performs another operation on a corresponding wireless access point based on the provided map information.

Here, a person skilled in the art should know that it is merely an example that the providing the map information loaded with the wireless access point includes presenting the map information at the user equipment, and another existing or potential manner of providing the map information loaded with the wireless access point that is applicable to the present application shall fall within the protection scope of the present application, and is incorporated herein by way of reference.

Here, a person skilled in the art should know that the device 1 is preferably user equipment and the step S401, the step S402, and the step S403 are implemented in the user equipment. In addition, the device 1 may further be a network device. Further, the step S401, the step S402, and the step S403 are implemented in the network device. In addition, in the present application, it is possible at least one of the step S401, the step S402, and the step S403 is implemented in the user equipment, and meanwhile, at least one of the step S401, the step S402, and the step S403 is implemented in the network device.

Here, in the present application, wireless access points corresponding to target location information are loaded into corresponding map information, and the map information loaded with the wireless access points is provided to corresponding user equipment, so that a user in need may intuitively know spatial locations of the wireless access points by using the map information and may further perform a corresponding subsequent operation.

Preferably, in the step S402, the device 1 loads the at least one of the one or more wireless access points into the map information corresponding to the target location information according to access point location information corresponding to the wireless access point, where a loading location of the wireless access point in the map information matches a location of the access point.

Specifically, the device 1 may preferably be user equipment. Here, for example, the wireless access point acquired by the user equipment is from a corresponding network device. Preferably, the acquired wireless access point corresponds to the access point related information including the access point location information of the wireless access point. The access point location may be latitude and longitude information corresponding to the wireless access point, or may be specific address information or the like corresponding to the wireless access point. Moreover, the region covered by the map information includes the access point location information of the wireless access point. Further, a map location corresponding to the access point location information of the wireless access point in the map information is a specific matching loading location of the wireless access point in the map information. Therefore, the at least one of the one or more wireless access points is loaded into the map information corresponding to the target location information based on the loading location.

Preferably, the method further includes step S404 (not shown). In the step S404, the device 1 determines display ratio information corresponding to the at least one of the one or more wireless access points in the map information. In the step S403, the device 1 provides the map information loaded with the wireless access point according to the display ratio information.

Specifically, the device 1 may preferably be user equipment. Here, the map information corresponds to the target location information. The region covered by the map information needs to include the target location information. Further, the target location information is preferably used as the center in the region covered by the map information. Here, the map information is preferably presented at the user equipment or any other smart terminal device having a display interface. The display interface of the user equipment is limited, especially when the user equipment is a small smart terminal device such as a smartphone and a tablet computer. Therefore, the corresponding display ratio information may be determined. For example, the target location information is used as the display center, and a minimum value of a distance between two wireless access points of the wireless access points loaded into the map information may be selected as the minimum granularity of the map information being initially displayed on the display interface. In this case, different wireless access points can be directly and distinctly recognized in the map information based on a location relationship. For another example, an optimal value of the quantity of wireless access points displayed on the display interface of the user equipment may be preset first. Therefore, based on information about the value, the display ratio information corresponding to the map information is flexibly adjusted, so that the corresponding user may at the same time view a wireless access point corresponding to the optimal value on an initial display interface corresponding to the map information based on the selected display ratio information. For another example, the target location information may alternatively be used as the display center, and all the loaded wireless access points are presented on the interface of the user equipment at the same time. In this case, a display ratio of the presented map information is the determined display ratio information.

Next, based on the determined display ratio information, in the step S403, the user equipment provides the map information loaded with the wireless access point according to the display ratio information. Here, the map information that is provided by the user equipment and is based on the display ratio information is only a preset preferred display state, and different display ratio information focuses on user requirements in different scenarios. For example, the display ratio information preset by user equipment may follow a same standard. For example, in any user equipment, a display ratio of 1:N is used to provide the map information loaded with the wireless access point. For another example, different display ratio information may alternatively be preset based on different display terminals. For example, in user equipment A, a display ratio of 1:M is used to provide the map information, whereas in user equipment B, a display ratio of 1:L is used to provide the map information. Further alternatively, even for a same display terminal, if specific application examples are different, the determined display ratio information may be different. For example, for same user equipment, different quantities of wireless access points are determined based on different target location information, and further, the eventually provided map information loaded with the wireless access point may correspond to different display ratio information. In addition, if subsequently, the corresponding user hopes to query access point information of a corresponding wireless access point or select a wireless access point to establish a connection or perform another operation on a wireless access point based on the provided map information, the display ratio of the map information presented on the display interface of the user equipment may be arbitrarily adjusted based on a customized gesture operation.

Here, in the present application, display ratio information is determined, and the map information loaded with the wireless access point is provided based on the display ratio information, so that the user equipment may present optimal map information based on different application scenarios, making it convenient for the user to correspondingly view the map information, make a selection in the map information or perform another operation on the map information, including the wireless access point loaded into the map information, thereby optimizing user experience.

Figure 5:
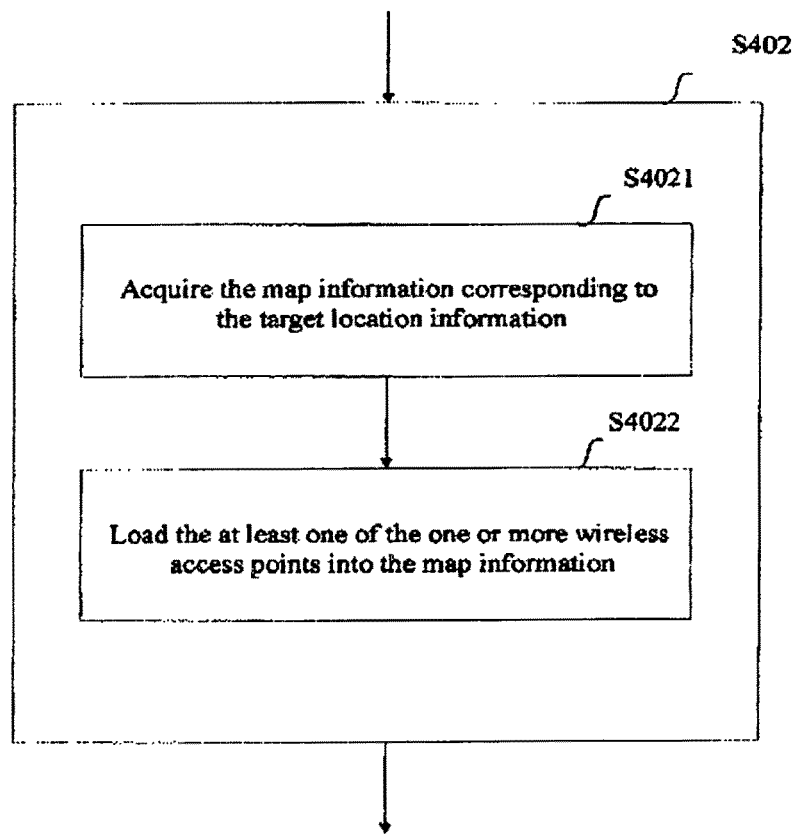
FIG. 5 is a partial flowchart of a method for providing a wireless access point according to still another preferred embodiment of the present application.

FIG. 5 is a partial flowchart of a method for providing a wireless access point according to still another preferred embodiment of the present application. The step S402 includes step S4021 and step S4022.

In the step S4021, the device 1 acquires the map information corresponding to the target location information. In the step S4022, the device 1 loads the at least one of the one or more wireless access points into the map information.

Specifically, the device 1 may preferably be user equipment. First, in the step S4021, the user equipment acquires the map information corresponding to the target location information. Here, the map information may be acquired from a network device corresponding to the user equipment, or the corresponding map information may be acquired from another third-party device or database. Here, the precision of location information in the map information needs to match the target location information. The map information corresponds to the target location information. For example, the region covered by the map information needs to include the target location information. Further, the target location information is preferably used as the center in the region covered by the map information. In this case, the region covered by the map information may further be determined based on the target location information and in combination with an actual user requirement. Next, in the step S4022, the user equipment loads the at least one of the one or more wireless access points into the map information. Here, the access point location information corresponding to the wireless access point loaded into the map information is included in the region covered by the map information.

Preferably, in the step S4021, the device 1 determines coverage information corresponding to the one or more wireless access points according to the access point location information corresponding to the wireless access point, so as to acquire the map information corresponding to the target location information according to the target location information and the coverage information.

Specifically, the device 1 may preferably be user equipment. Here, wireless access points acquired by the user equipment respectively correspond to corresponding access point location information. For example, wireless access points R1, R2, R3, . . . respectively correspond to access point location information T1, T2, T3, . . . . Therefore, the coverage information corresponding to the one or more wireless access points may be determined based on the access point location information T1, T2, T3, . . . . Further, preferably, a region covered by the map information that needs to be acquired from the corresponding network device or the another third-party device or database and is used for loading the wireless access point may be determined based on the coverage information. Here, further, the acquired map information may preferably be determined based on both the target location information and the coverage information. For example, an area that uses the target location as the center and the coverage as the radius is the region covered by the map information, and all the wireless access points are covered in the map information.

Figure 6:
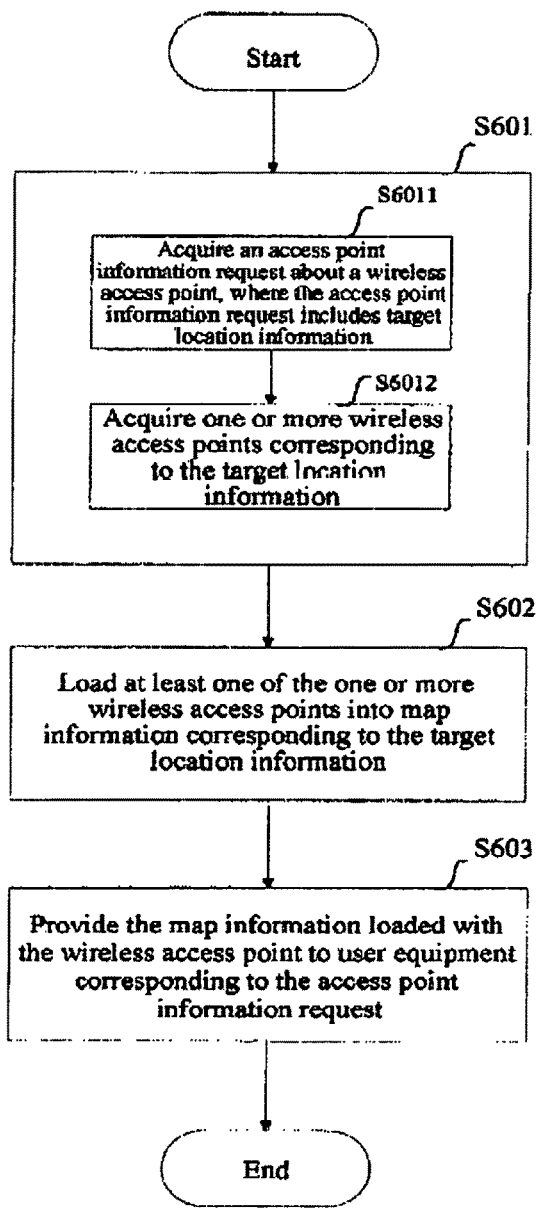
FIG. 6 is a flowchart of a method for providing a wireless access point according to still another preferred embodiment of the present application.

FIG. 6 is a flowchart of a method for providing a wireless access point according to still another preferred embodiment of the present application. The method includes step S601, step S602, and step S603. The step S601 further includes step S6011 and step S6012.

In the step S6011, the device 1 acquires an access point information request about a wireless access point, where the access point information request includes target location information. In the step S6012, the device 1 acquires one or more wireless access points corresponding to the target location information. Here, in the step S602, the device 1 loads at least one of the one or more wireless access points into map information corresponding to the target location information. Here, in the step S603, the device 1 provides the map information loaded with the wireless access point to user equipment corresponding to the access point information request.

Specifically, in the step S6011, the device 1 acquires an access point information request about a wireless access point, where the access point information request includes the target location information. Preferably, the device 1 may be a network device. Here, the access point information request about a wireless access point acquired by the network device may be from the user equipment corresponding to the network device. The access point information request sent by the user equipment includes request information automatically sent by the user equipment based on a particular trigger condition, or further includes request information that is acquired by the user equipment and is directly sent by a corresponding user. Based on the characteristic that spatial location information is used as an identifier for the map information, the access point information request preferably includes the target location information. The target location information may include current geographical location information of the user equipment, or may further include geographical location information arbitrarily selected by the corresponding user.

Next, in the step S6012, the device 1 acquires the one or more wireless access points corresponding to the target location information. Preferably, the device 1 may be a network device. Here, the network device searches, based on the acquired target location information, a massive amount of wireless access points stored in the network device for wireless access point(s) matching the target location information. For example, a particular search range is set. For example, all wireless access points in a range that uses the target location information as the center and has a diameter W are the one or more wireless access points corresponding to the target location information.

Next, in the step S602, the device 1 loads at least one of the one or more wireless access points into the map information corresponding to the target location information. Here, the step S602 is preferably a step implemented in the network device. The map information may be from another third-party device or database. Here, the specific map information may be determined based on the target location information, and then the wireless access point is loaded into the determined specific map information. Here, the map information includes electronic map information in various forms. In this case, the precision of location information in the map information needs to match the target location information. The map information corresponds to the target location information. For example, the region covered by the map information needs to include the target location information. Further, the target location information is preferably used as the center in the region covered by the map information.

Next, in the step S603, the device 1 provides the map information loaded with the wireless access point to user equipment corresponding to the access point information request. Here, the step S603 is a step implemented in only the network device. Here, the network device determines the map information loaded with the wireless access point. Further, the map information may be provided to the corresponding user equipment or another smart terminal device in need according to an actual application requirement. Preferably, the map information is sent to the corresponding user equipment that sends the access point information request. Here, the user equipment or any other device may perform another subsequent operation based on the provided map information. For example, the user corresponding to the user equipment views a corresponding wireless access point or selects a corresponding wireless access point to establish a connection or performs another operation on a corresponding wireless access point based on the provided map information.

In this preferred embodiment, the device is the network device. In the present application, based on an actual requirement of the user equipment corresponding to the network device, for example, based on that the user equipment needs to know access point information of the wireless access point corresponding to the target location information, the map information loaded with information about the corresponding wireless access point is generated, and the network device provides the determined map information to the corresponding user equipment in need, making it convenient for the user corresponding to the user equipment to know the wireless access point and the access point related information corresponding to the wireless access point or establish a corresponding wireless connection based on intuitive map information.

Here, a person skilled in the art should know that the step S601 and the step S602 may be steps implemented in the network device or steps implemented in the user equipment. The step S603 is a step implemented in the network device only.

Preferably, in the step S6011, when a trigger condition of requesting access point information is met, the device 1 acquires the access point information request about a wireless access point, where the access point information request includes the target location information.

Specifically, here, the device 1 is preferably user equipment. Here, when the trigger condition occurs, the user equipment may determine a corresponding access point information request. The trigger condition may include an active request operation of the user. For example, the user corresponding to the user equipment actively triggers, based on operation prompt information displayed on an interface of the user equipment, submission of a request of acquiring map information matching the target location information and loaded with information about a wireless access point. The trigger condition may further include a corresponding trigger condition preset by the user equipment or a network device corresponding to the user equipment. When the trigger condition occurs, the user equipment actively triggers the acquisition of the access point information request that includes the target location information, and further sends the access point information request about a wireless access point to a corresponding network device.

Further, the trigger condition preferably includes at least any one of the following: a trigger condition determined based on a network condition of the user equipment; that current network data consumption of the user equipment exceeds a preset threshold; and that an application of a predetermined type is currently running in the user equipment.

Specifically, here, the device 1 is preferably user equipment. Here, the trigger condition may include the trigger condition determined based on the network condition of the user equipment. For example, when the user equipment detects that the user equipment is using a mobile communications network such as a 3G digital communications network or a 4G digital communications network, the user equipment may actively send the access point information request or prompt the corresponding user to send the access point information request. The reason is that in most cases, the corresponding user equipment needs to pay to use the mobile communications network, but wireless access point provided in the map information has a high connection success rate, and a wireless access point shared by another person may usually be used for free. Here, the access point information request includes the target location information. Preferably, the target location information may be the current geographical location information of the user equipment.

Here, the trigger condition may further include that the current network data consumption of the user equipment exceeds the preset threshold. In this case, the user corresponding to the user equipment may customize a network data threshold of the user equipment. For example, the user may flexibly set a corresponding network data threshold based on a particular period, for example, every day or every month, so as to monitor the use of network data and avoid excessive use of the network data, particularly, to avoid excessive use of the network data when the user equipment needs to pay for the network data. Further, when the network data used by the user equipment exceeds the preset threshold, it is triggered to request access point information. Here, the access point information request includes the target location information. Preferably, the target location information may be the current geographical location information of the user equipment.

Here, the trigger condition may further include that the application of a predetermined type is currently running in the user equipment. Preferably, the application of a predetermined type includes an application that consumes a relatively large amount of data, for example, an application program that needs to load a relatively large quantity of pictures, videos, and audio. Specifically, the application of a predetermined type includes various online video applications. Here, the application of a predetermined type may be labeled and determined by the user, or may further be determined by the user equipment through statistical analysis and recommendation based on historical data information. Here, for the time of starting the trigger condition, the user equipment may automatically trigger to request access point information or prompt the user to trigger to request access point information as soon as the application of a predetermined type is started. Alternatively, further precisely, it may further be determined that the trigger condition occurs after the application of a predetermined type has been started for a particular time or after the application keeps consuming data for a particular time. Here, the access point information request includes the target location information. Preferably, the target location information may be the current geographical location information of the user equipment.

Here, a person skilled in the art should know that the foregoing trigger conditions are merely examples, and another existing or potential trigger condition that is applicable to the present application shall fall within the protection scope of the present application, and is incorporated herein by way of reference.

In the present application, when a trigger condition of requesting access point information is met, an access point information request about a wireless access point is acquired, so that a requirement for requesting access point information is actively determined for the user, and map information loaded with a corresponding wireless access point is provided to user equipment, thereby meeting wireless connection requirements of the user in different application scenarios, and saving data resources for the user.

Preferably, in the step S6012, the device 1 acquires one or more candidate wireless access points corresponding to the target location information; and preferably selects the one or more wireless access points from the one or more candidate wireless access points according to access point related information of the candidate wireless access point.

Specifically, here, the device 1 is preferably a network device. The network device searches, based on the acquired target location information, the massive amount of wireless access points stored in the network device for the one or more candidate wireless access points matching the target location information. For example, a particular search range is set. For example, all wireless access points in a range that uses the target location information as the center and has a diameter V are the one or more candidate wireless access points corresponding to the target location information. In this case, particularly, when a particular region has a relatively large quantity of candidate wireless access points, the candidate wireless access points have different connection success rates, different connection quality, and different conditions about whether it is convenient for the user to connect to the candidate wireless access points, among other factors. Therefore, if the large quantity of wireless access points is provided without distinction, it is particularly difficult for the user to select a wireless access point, and the user cannot desirably determine whether a wireless access point has a relatively high connection success rate. Therefore, preferably, a candidate wireless access point may preferably be selected from the one or more candidate wireless access points based on access point related information corresponding to the wireless access point. The access point related information includes, but is not limited to, access point name information, location information, signal strength information, connection speed information, access information, architecture related information, navigation information, information about a distance from a target location, and whether information can be presented on the user equipment. For example, here, the wireless access point may preferably be a wireless access point that has relatively high signal strength, a relatively high connection speed, and a relatively short distance from the target location. In this case, an actual condition of an application corresponding to the user equipment may further be combined. For example, if the user equipment is currently used to make an online payment, it is hoped that a wireless network has a relatively high safety coefficient. In this case, safety information or the architecture related information of the wireless access points may be used as a reference, so as to preferably select a wireless access point that has a relatively high safety coefficient from the candidate wireless access points. Further, the network device loads the preferably selected one or more wireless access points into the map information corresponding to the target location information, and provides the map information to the corresponding user equipment or another third-party device in need.

Here, in the present application, a wireless access point suitable for being loaded into the map information is preferably selected from the candidate wireless access points based on access point related information that is stored in the network device and corresponds to the wireless access point. In this way, most valuable map information can be provided to the user according to an actual application requirement of the user, the user equipment can conveniently select a wireless access point based on preferably selected wireless access points loaded into the map information, and a connection success rate is relatively high, thereby optimizing user experience.

Referring to FIG. 4, preferably, the method further includes step S405 (not shown). In the step S405, the device 1 presents access point related information of a corresponding wireless access point in the map information according to an operation of viewing a wireless access point in the map information by the user.

Specifically, in the step S405, the device 1 only corresponds to a corresponding apparatus in the user equipment. Here, in the step S403, the device 1 provides the map information loaded with the wireless access point. Preferably, the providing the map information loaded with the wireless access point includes presenting the map information at the user equipment, for example, on a display interface of the user equipment. In this case, the wireless access point in the map information may be displayed by using any customized graphical sign. In addition, the wireless access point further matches the corresponding access point related information. Preferably, the access point related information is not directly displayed in the map information, but instead is associated with a graphical sign of the wireless access point. When the user performs an operation of viewing the presented graphical sign of the wireless access point in the map information, for example, selects the graphical sign of the wireless access point by using a customized gesture operation such as a tap or a long press, access point related information of the viewed wireless access point is presented on the display interface of the user equipment. For example, the access point related information is presented in the form of a small popup window. Here, all the access point related information corresponding to the viewed wireless access point may be presented. Alternatively, a presentation manner or specific presented content may be flexibly set according to the size of a display presentation area of the user equipment and an application scenario. In addition, the user may further directly search the map information for a wireless access point with known name information. For example, the user directly enters name information of a wireless access point to be viewed in an information input box presented on the display interface of the user equipment, so as to rapidly locate the wireless access point, making it convenient for the user to view the information of the wireless access point.

Here, in the present application, access point related information of a specific wireless access point is presented based on an operation of viewing a wireless access point in the map information by the user, so that information data acquired by the user is enriched, and the user may preferably select, based on the access point related information, a wireless access point suitable for establishing a wireless connection.

In a preferred embodiment (referring to FIG. 4), the method further includes step S406 (not shown). In the step S406, the device 1 establishes a wireless connection between the corresponding user equipment and a corresponding wireless access point according to an operation of connecting to a wireless access point in the map information by the user.

Specifically, the device 1 is preferably user equipment. Here, the wireless access point in the map information presented in the user equipment may match a corresponding connection operation. That is, based on the selection of the wireless access point by the user, the wireless connection between the user equipment and the wireless access point is established. For example, if access information, for example, access password information, corresponding to the selected wireless access point is already stored in the user equipment, based on a defined connection operation by the user, for example, an operation of tapping a connection icon provided on the interface by the user and in combination with the access password information, a request of establishing the wireless connection is sent to the corresponding wireless access point. For another example, if the access information corresponding to the selected wireless access point is not stored in the user equipment, based on a defined connection operation by the user, for example, an operation of tapping a connection icon provided on the interface by the user, a request of acquiring the access information of the wireless access point is sent to a network device corresponding to the user equipment. Further, the wireless connection with the wireless access point is established based on the acquired access information, for example, the acquired access password information.

Here, in the present application, at the same time when a user views map information, the user may conveniently and directly establish a corresponding wireless connection based on a viewed and selected wireless access point. Therefore, complex operations of switching between different applications or different interfaces in viewing and connecting to a wireless access point are avoided, so as to improve the efficiency of establishing a wireless connection based on the wireless access point by the user, thereby optimizing user experience.

Preferably, the step S402 further includes the step S4023 (not shown). In the step S4023, the device 1 inserts a wireless connection module at a loading location of the wireless access point in the map information. In the step S406, the device 1 executes the wireless connection module according to an operation of connecting to a wireless access point in the map information by the user to establish the wireless connection between the corresponding user equipment and the corresponding wireless access point.

Specifically, the device 1 is preferably user equipment. In the step S4023, the user equipment inserts a wireless connection module at the loading location of the wireless access point in the map information. Here, when the wireless access point is loaded at a corresponding location in the map information based on corresponding access point location information, a wireless connection module matching the wireless access point is inserted at the loading location at the same time. The wireless connection module includes an executable page script file corresponding to a wireless connection operation. For example, a page script file describing an action of establishing a wireless connection with the wireless access point is loaded into the map information. In this way, when the user equipment acquires the operation of connecting to a wireless access point in the map information by the user, it is triggered to invoke and execute the corresponding script file in the background to respond to a connection operation of the user. Based on this, in the step S406, the device 1 establishes the wireless connection between the corresponding user equipment and the corresponding wireless access point.

Here, a person skilled in the art should know that the foregoing executable page script file corresponding to the wireless connection operation is merely an example, and another existing or potential wireless connection module that is applicable to the present application shall fall within the protection scope of the present application, and is incorporated herein by way of reference.

Figure 7:
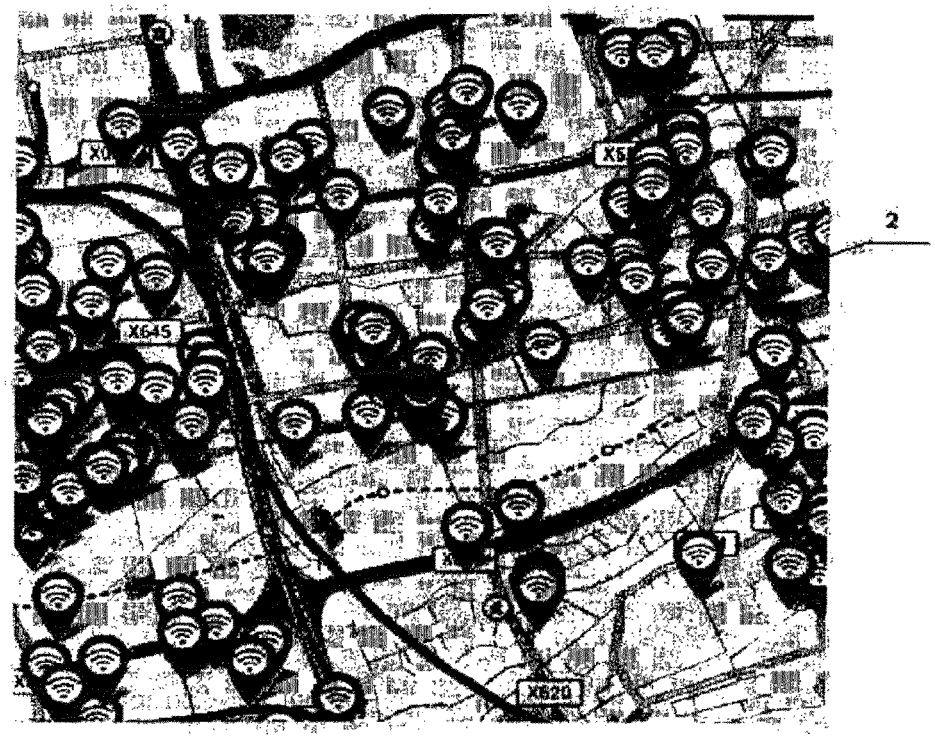
FIG. 7 is a schematic diagram of map information loaded with wireless access points according to yet another preferred embodiment of the present application.

FIG. 7 is a schematic diagram of map information loaded with wireless access points according to yet another preferred embodiment of the present application.

Specifically, the device 1 is preferably user equipment. The map information loaded with wireless access points is presented on a display interface of the user equipment. Here, a central location of a screen is target location information 2, and multiple wireless access points matching the target location information 2 are loaded at corresponding locations in the map information in the form of water-drop icons based on access point location information of the multiple wireless access points. Here, a user may flexibly adjust display content on the screen based on a zoom-in or zoom-out gesture operation. Further, the user may view access point related information of a corresponding wireless access point by performing a gesture operation such as a tap or a long press on a water-drop icon. In this case, the access point related information such as access point name information, location information, signal strength information, connection speed information, access information, architecture related information, and navigation information is presented in the map information. Further, a wireless connection between the corresponding user equipment and the corresponding wireless access point may further be established based on a connection operation on a water-drop icon that indicates a wireless access point.

It is apparent to a person skilled in the art that the present application is not limited to details in the foregoing exemplary embodiments, and the present application can be implemented in another specific form without departing from the spirit or basic features of the present application. Therefore, the embodiments should be considered to be exemplary in all respects and not limitative. The scope of the present application is not defined by the foregoing description but by the appended claims. The present application is intended to include all the variations that are equivalent in significance and scope to the claims. No reference numerals in the claims should be considered as limitations to the related claims. In addition, the term "include" apparently does not exclude other units or steps, and a singular form does not exclude a plural form. Multiple units or apparatuses recited in an apparatus claim may also be implemented by one unit or apparatus through software or hardware. Terms such as "first" and "second" are used to indicate names, but do not indicate any particular sequence.

What is claimed is:

1. A method for providing a wireless access point, comprising:
    acquiring one or more wireless access points corresponding to target location information, wherein the target location information includes latitude and longitude information of a target location;
    loading at least one of the one or more wireless access points into map information corresponding to the target location information; and
    providing the map information loaded with the wireless access point;
    wherein the step of acquiring one or more wireless access points corresponding to the target location information comprises acquiring an access point information request about a wireless access point; wherein the access point information request comprises the target location information; and acquiring the one or more wireless access points corresponding to the target location information;
    wherein the step of acquiring an access point information request about a wireless access point comprises when a trigger condition of requesting access point information is met, acquiring the access point information request about a wireless access point, wherein the access point information request comprises the target location information;
    wherein the trigger condition comprises at least one item selected from the group consisting of a trigger condition determined based on a network condition of the user equipment, a current network data consumption of the user equipment exceeding a preset threshold and an application of a predetermined type currently running in the user equipment;
wherein the step of providing the map information loaded with the wireless access point comprises providing the map information loaded with the wireless access point to a user equipment corresponding to the access point information request;
wherein the step of loading at least one of the one or more wireless access points into map information corresponding to the target location information comprises loading the at least one of the one or more wireless access points into the map information corresponding to the target location information according to access point location information corresponding to the wireless access point, wherein a loading location of the wireless access point in the map information matches a location of the access point.

2. The method according to claim 1, wherein the step of loading at least one of the one or more wireless access points into map information corresponding to the target location information comprises:
acquiring the map information corresponding to the target location information; and
loading the at least one of the one or more wireless access points into the map information.

3. The method according to claim 2, wherein the step of acquiring the map information corresponding to the target location information comprises:
determining coverage information corresponding to the one or more wireless access points according to the access point location information corresponding to the wireless access point; and
acquiring the map information corresponding to the target location information according to the target location information and the coverage information.

4. The method according to claim 1, further comprising:
determining display ratio information corresponding to the at least one of the one or more wireless access points in the map information, wherein
the step of providing the map information loaded with the wireless access point comprises:
providing the map information loaded with the wireless access point according to the display ratio information.

5. The method according to claim 1, wherein the step of acquiring the one or more wireless access points corresponding to the target location information comprises:
acquiring one or more candidate wireless access points corresponding to the target location information; and
selecting the one or more wireless access points from the one or more candidate wireless access points according to access point related information of the candidate wireless access point.

6. The method according to claim 1, further comprising:
presenting access point related information of a corresponding wireless access point in the map information according to an operation of viewing a wireless access point in the map information by a user.

7. The method according to claim 1, further comprising:
establishing a wireless connection between a corresponding user equipment and a corresponding wireless access point according to an operation of connecting to a wireless access point in the map information by a user.

8. The method according to claim 7, wherein the step of loading at least one of the one or more wireless access points into map information corresponding to the target location information further comprises:
inserting a wireless connection module at a loading location of the wireless access point in the map information, wherein the step of establishing a wireless connection between a corresponding user equipment and a corresponding wireless access point according to an operation of connecting to a wireless access point in the map information by the user comprises:
executing the wireless connection module according to an operation of connecting to a wireless access point in the map information by the user to establish the wireless connection between the corresponding user equipment and the corresponding wireless access point.

9. A non-transitory computer-readable medium storing instructions which when executed by one or more processors, cause an apparatus at least to:
acquire one or more wireless access points corresponding to target location information, wherein the target location information includes latitude and longitude information of a target location;
load at least one of the one or more wireless access points into map information corresponding to the target location information; and
provide the map information loaded with the wireless access point;
wherein the step of acquiring one or more wireless access points corresponding to the target location information comprises acquiring an access point information request about a wireless access point, wherein the access point information request comprises the target location information; and acquiring the one or more wireless access points corresponding to the target location information;
wherein the step of acquiring an access point information request about a wireless access point comprises when a trigger condition of requesting access point information is met, acquiring the access point information request about a wireless access point, wherein the access point information request comprises the target location information;
wherein the trigger condition comprises at least one item selected from the group consisting of a trigger condition determined based on a network condition of the user equipment, a current network data consumption of the user equipment exceeding a preset threshold and an application of a predetermined type currently running in the user equipment;
wherein the step of providing the map information loaded with the wireless access point comprises providing the map information loaded with the wireless access point to a user equipment corresponding to the access point information request;
wherein the step of loading at least one of the one or more wireless access points into map information corresponding to the target location information comprises loading the at least one of the one or more wireless access points into the map information corresponding to the target location information according to access point location information corresponding to the wireless access point, wherein a loading location of the wireless access point in the map information matches a location of the access point.

10. An apparatus, comprising:
a memory; and
one or more processors executing instructions stored in the memory to cause the apparatus to:

acquire one or more wireless access points corresponding to target location information, wherein the target location information includes latitude and longitude information of a target location;

load at least one of the one or more wireless access points into map information corresponding to the target location information; and provide the map information loaded with the wireless access point;

wherein the step of acquiring one or more wireless access points corresponding to the target location information comprises acquiring an access point information request about a wireless access point, wherein the access point information request comprises the target location information; and acquiring the one or more wireless access points corresponding to the target location information;

wherein the step of acquiring an access point information request about a wireless access point comprises when a trigger condition of requesting access point information is met, acquiring the access point information request about a wireless access point, wherein the access point information request comprises the target location information;

wherein the trigger condition comprises at least one item selected from the group consisting of a trigger condition determined based on a network condition of the user equipment, a current network data consumption of the user equipment exceeding a preset threshold and an application of a predetermined type currently running in the user equipment;

wherein the step of providing the map information loaded with the wireless access point comprises providing the man information loaded with the wireless access point to a user equipment corresponding to the access point information request;

wherein the step of loading at least one of the one or more wireless access points into map information corresponding to the target location information comprises loading the at least one of the one or more wireless access points into the map information corresponding to the target location information according to access point location information corresponding to the wireless access point, wherein a loading location of the wireless access point in the map information matches a location of the access point.

* * * * *